United States Patent
Padiou et al.

(10) Patent No.: US 6,558,586 B1
(45) Date of Patent: May 6, 2003

(54) PROCESS FOR FABRICATING A SURFACE OF AN OPHTHALMIC LENS, INSTALLATION FOR IMPLEMENTING THE PROCESS AND OPHTHALMIC LENS OBTAINED BY THE PROCESS

(75) Inventors: Jean-Marc Padiou, Champigny-sur-Marne (FR); Joel Bernard, Ormesson (FR); Christophe Jeannin, Saint Maur des Fosses (FR)

(73) Assignee: Essilor International (Compagnie Generale D'Optique), Paris (FR)

( * ) Notice: Subject to any disclaimer, the term of this patent is extended or adjusted under 35 U.S.C. 154(b) by 0 days.

(21) Appl. No.: 09/519,601

(22) Filed: Mar. 6, 2000

(51) Int. Cl.$^7$ .............................. B29D 11/00; B24B 1/00
(52) U.S. Cl. ............................ 264/1.7; 264/2.7; 451/42
(58) Field of Search .................. 264/1.7, 2.7; 451/42, 451/56, 58, 159, 165, 164, 158, 160

(56) References Cited

U.S. PATENT DOCUMENTS

| 5,417,130 A | 5/1995 | Dorsch |
| 5,452,031 A | 9/1995 | Ducharme |
| 5,919,013 A | 7/1999 | Savoie |
| 5,938,381 A | 8/1999 | Diehl et al. |

FOREIGN PATENT DOCUMENTS

| DE | 19616526 A1 | 11/1997 |
| EP | 0281754 A2 | 9/1988 |
| EP | 0685298 A1 | 12/1995 |
| EP | 0758571 A1 | 2/1997 |
| EP | 0849038 A2 | 6/1998 |
| WO | WO9200832 | 1/1992 |

Primary Examiner—Mathieu D. Vargot
(74) Attorney, Agent, or Firm—Young & Thompson

(57) ABSTRACT

A process is disclosed of fabricating a surface of an ophthalmic lens. The process includes a step a) of machining the surface by removing material by moving a cutting tool along a continuous trajectory to form grooves, two adjacent grooves being spaced by a constant pitch from 0.01 mm to 3 mm, and a step b) of smoothing the machined surface by moving a smoothing tool along a continuous trajectory formed of passes, two adjacent passes being spaced by a constant pitch from 0.2 mm to 3 mm, to effect band-pass filtering of the undulations of the surface between a low frequency corresponding to a surface envelope and a high frequency corresponding to a background roughness.

27 Claims, 6 Drawing Sheets

PROCESS FOR FABRICATING A SURFACE
OF AN OPHTHALMIC LENS,
INSTALLATION FOR IMPLEMENTING THE
PROCESS AND OPHTHALMIC LENS
OBTAINED BY THE PROCESS

BACKGROUND OF THE INVENTION

1. Field of the Invention

The present invention relates generally to the fabrication of ophthalmic lenses to be mounted in a spectacle frame.

It relates more particularly to a process for fabricating a surface of an ophthalmic lens, in accordance with a given prescription, an installation for implementing the process and an ophthalmic lens having at least one surface obtained by the process.

The surface to be formed can be spherical, aspherical, toric, atoric or more generally a complex surface such as a progressive surface, although the invention is not limited to this type of surface.

2. Description of the Prior Art

Highly sophisticated machines are available for fabricating a surface of an ophthalmic lens having an acceptable optical quality in a single machining step. This implies a very slow rate of advance of the machining tool, a very small overlapping pitch of the tool over the surface to be machined, very precise positioning of the machining tool on said surface and a very long machining time.

These high-precision machines are relatively costly and the machining times entailed are long, which leads to a cost of production of ophthalmic lenses that would be prohibitive on an industrial scale.

The present invention therefore proposes a new process for quickly forming a surface of an ophthalmic lens in accordance with a given prescription using less accurate machines but obtaining a lens surface of good optical quality and which also satisfies cosmetic requirements.

SUMMARY OF THE INVENTION

To be more precise, the process of the invention includes the following steps:

a) machining the surface by removing material by moving a cutting tool along a continuous trajectory in a surface envelope to be achieved to form grooves, two adjacent grooves being spaced by a constant pitch from 0.01 mm to 3 mm, to obtain a surface having an arithmetic mean roughness Ra from approximately 0.1 $\mu$m to approximately 0.7 $\mu$m, and b) smoothing the machined surface by moving a smoothing tool along a continuous trajectory formed of passes within a surface envelope to be achieved, two adjacent passes being spaced by a constant pitch from 0.2 mm to 3 mm, to effect band-pass filtering of the undulations of the surface between a low frequency corresponding to the surface envelope and a high frequency corresponding to a background roughness, to obtain a smoothed surface having an arithmetic mean roughness Ra less than 0.1 $\mu$m.

In the process of the invention, a smoothed surface having a roughness Ra from 0.05 $\mu$m to 0.07 $\mu$m is preferably obtained in step b).

The trajectory of the cutting tool and the trajectory of the smoothing tool in steps a) and b) are advantageously spirals.

The process according to the invention can use a semifinished lens having one molded face, for example, the other face being adapted to the prescription of the wearer.

It is equally possible to use a semifinished lens of which both spherical faces are parallel, in which case both surfaces are modified by the process of the invention.

After step b) the process of the invention advantageously includes a step c) of applying to the smoothed surface a layer of varnish to confer a polished surface state on the surface.

This latter step c) replaces the polishing operation which is slow and tiresome and which necessitates a special tool for each surface geometry.

The thickness of the layer of varnish deposited on the surface in step c) can be from approximately 500 Ra to approximately 800 Ra, where Ra corresponds to the surface roughness obtained in step b).

The minimum thickness of the layer of varnish deposited on the surface in accordance with the invention is from approximately 30 Ra to approximately 200 Ra, where Ra corresponds to the roughness of the surface obtained in step b).

The varnish deposited in the liquid state on the surface by the process of the invention preferably has a viscosity at 25° C. from 1000 mPas to 3000 mPas.

According to the invention, the machining process of step a) can be milling or turning.

In the case of turning, a vertical lathe such as the SCHNEIDER HSC 100 CNC machine can be used, for example. A machine of this kind is described in patent application EP 0 849 038.

The invention also concerns an installation for implementing the aforementioned process, the installation including a numerically controlled machining machine tool including a lens support mobile in translation along a vertical axis and adapted to be driven in rotation about a vertical axis and a milling tool mobile in translation along a horizontal axis, inclinable relative to a vertical axis and driven in rotation about a vertical axis, the advance motions of the support and the tool, i.e. the translation and rotation motions of the support and the translation and inclination motions of the tool, being controlled simultaneously by the numerical control unit, the speed and rotation of the milling tool being controlled by the numerical control unit.

The installation advantageously further includes a numerically controlled smoothing machine tool including a lens support mobile in translation along a vertical axis and adapted to be driven in rotation about a vertical axis and a smoothing tool mobile in translation along a horizontal axis, inclinable relative to a vertical axis and driven in rotation about a vertical axis, the advance motions of the support and the tool, i.e. the translation and rotation motions of the support and the translation and inclination motions of the tool, being controlled simultaneously by the numerical control unit, the speed of rotation of the smoothing tool being controlled by the numerical control unit.

The smoothing tool of the smoothing machine in accordance with the invention preferably includes a rigid support and a tool fastened to the support which is annular in shape and whose dimensions are small compared to those of the surface to be smoothed but relatively large relative to the surface defects to be eliminated.

The tool includes the following superposed components: an elastically deformable core having a Shore A hardness from 30 to 80°, an elastically deformable surface layer whose elasticity is less than that of the core, and an abrasive film or a support driving an abrasive which forms the working surface of the tool.

The installation in accordance with the present invention advantageously further includes a machine for applying a layer of varnish to the smoothed surface of the lens, which machine includes a lens support adapted to be driven in rotation and an arm carrying a nozzle for distributing the liquid varnish at a low pressure adapted to be moved in translation vertically and horizontally relative to the support.

The following description, which is given by way of non-limiting example and with reference to the accompanying drawings, explains in what the invention consists and how it can be put into effect.

DETAILED DESCRIPTION OF THE PREFERRED EMBODIMENTS

Figure 1:
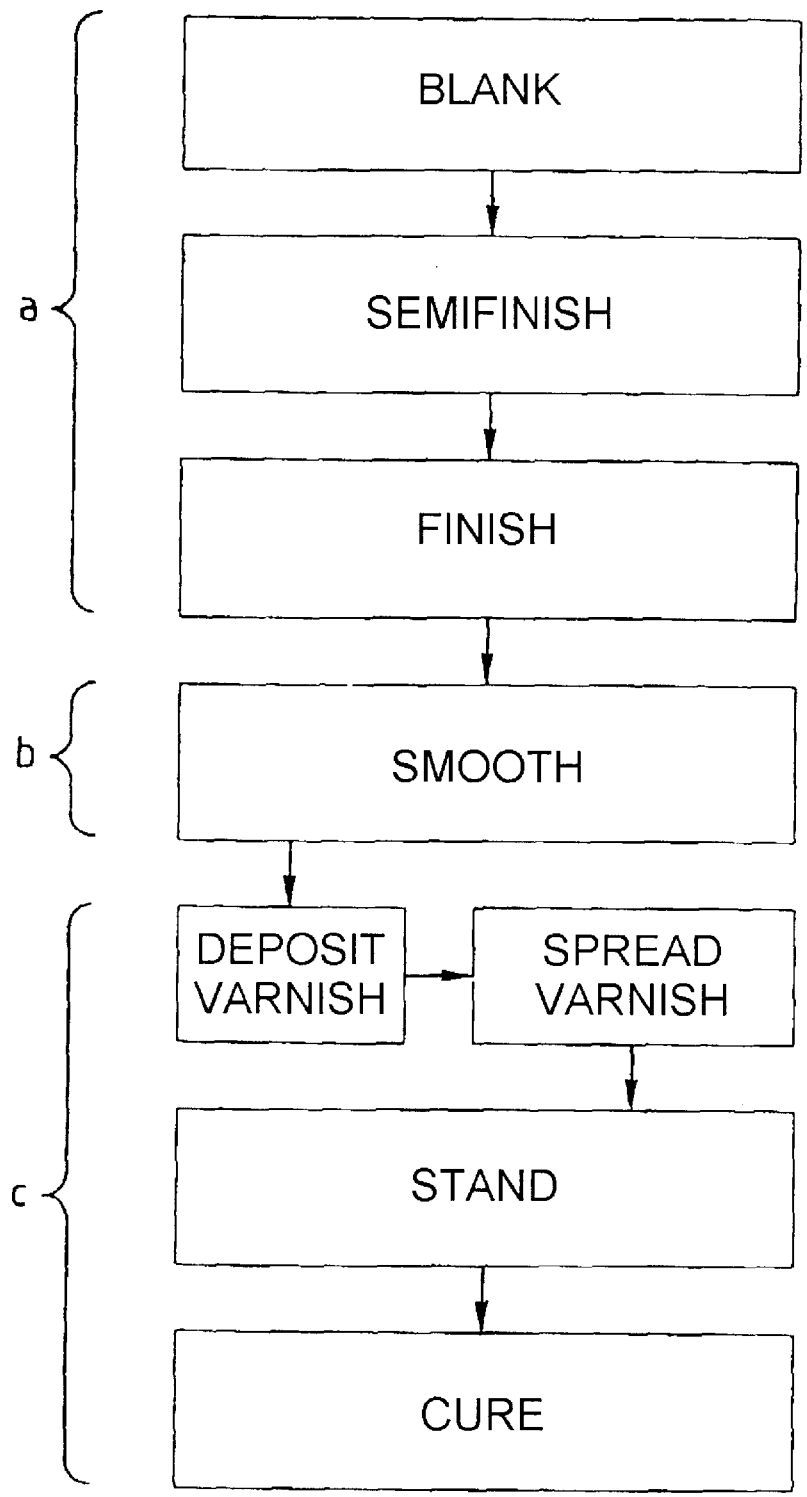
FIGS. 1 and 2 are flowcharts of two embodiments of a process in accordance with the invention.
Figure 2:
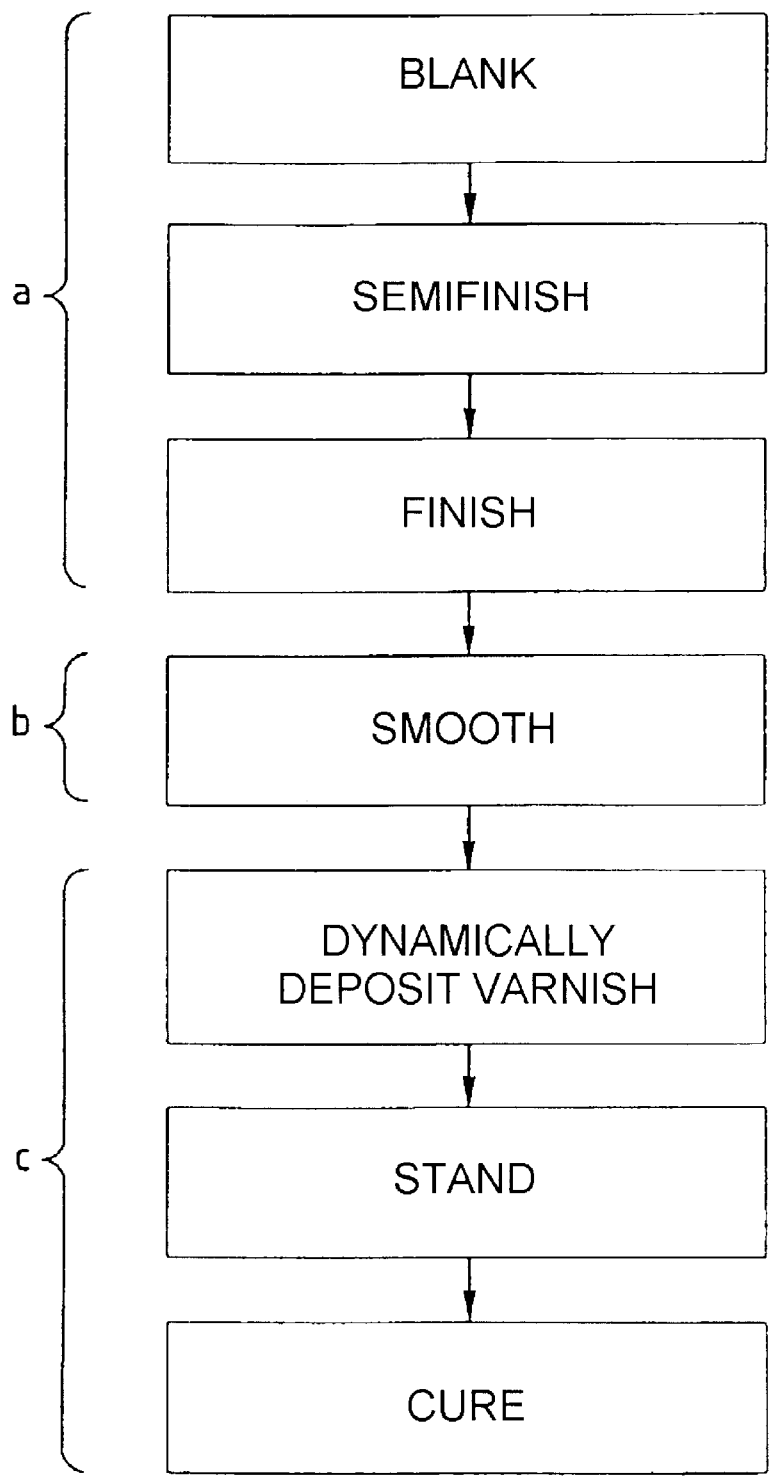

FIGS. 1 and 2 are flowcharts of two embodiments of a process for fabricating a surface of an ophthalmic lens according to a given prescription.

This process preferably uses a semifinished lens with a molded front or rear face, the other face being adapted by the process to the required optical prescription. Both surfaces of the lens can equally well be formed by the process of the invention.

Figure 3:
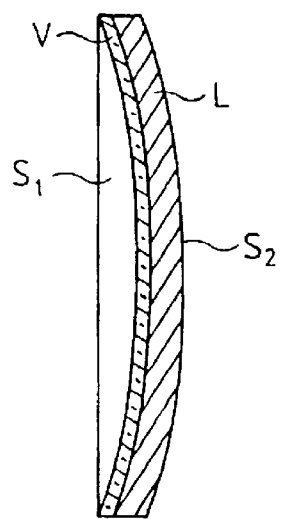
FIG. 3 is a diagrammatic view in longitudinal section of an ophthalmic lens in accordance with the invention.

FIG. 3 shows an ophthalmic lens L obtained by the fabrication process described hereinafter.

Here the surface $S_1$ of the ophthalmic lens L adapted to the prescription by the fabrication process described is the concave rear surface $S_1$, the convex front surface $S_2$ being obtained by molding.

The fabrication process represented includes a first step a) of machining said surface by removing material by moving a milling tool along a continuous trajectory within a surface envelope to be obtained, to form grooves 2 (see FIG. 4a), two adjacent grooves 2 being spaced by a constant pitch P from 0.01 mm to 3 mm, to obtain a surface having an arithmetic mean roughness Ra from approximately 0.1 μm to approximately 0.7 μm.

A TAYLOR HOBSON FTS (Form Talysurf Series) profilometer/roughness measuring system is advantageously used to determine the arithmetic mean roughness Ra of the surface.

The system includes a laser head (product reference 112/2033-308, for example) and a 70 mm long feeler (product reference 112/1836) having a 2 mm radius spherical/conical head.

The system measures a two-dimensional profile in the chosen section plane to obtain a curve Z=f(x). In this example the profile is acquired over a distance of 10 mm.

Various surface characteristics can be extracted from this profile, in particular its shape, undulation and roughness.

Accordingly, to determine the roughness Ra, the profile is subject to two different processes, namely shape extraction and filtering, which corresponds to mean line extraction.

The various steps for determining a parameter Ra of this kind are as follows:

acquisition of the profile Z=f(x), shape extraction, filtering (mean line extraction), and determination of the parameter Ra.

The profile acquisition step consists in moving the stylus of the aforementioned system over the surface of the lens in question, to store the altitudes Z of the surface as a function of the displacement X.

In the shape extraction step, the profile obtained in the previous step is related to an ideal sphere, i.e. a sphere with minimum profile differences relative to that sphere. The mode chosen here is the LS arc mode (best circular arc extraction).

This provides a curve representative of the characteristics of the profile of the surface in terms of undulation and roughness.

The filtering step retains only defects corresponding to certain wavelengths. In this example, the aim is to exclude undulations, a form of defect with wavelengths higher than the wavelengths of defects due to roughness. Here the filter is of the Gaussian type and the cut-off used is 0.08 mm.

The arithmetic mean roughness Ra is determined from the curve obtained using the following equation:

$$Ra = \frac{1}{N}\sum_{n=1}^{N} |Z_n|$$

where $Z_n$ is, for each point, the algebraic difference Z relative to the mean line calculated during filtering.

The trajectory of the milling tool during step a) is preferably a spiral (see FIG. 5) whose projection in the horizontal X, Y plane is a constant pitch spiral 1.

A rotation direction for the milling tool can be chosen during this step a) so that it "pulls" or "pushes".

Here, the milling tool preferably has a "pull" rotation direction in step a).

Moreover, in step a), the depth of the pass of the milling tool is from approximately 4 mm to approximately 0.05 mm and the advance per tooth of the milling tool is from 0.05 mm to 0.03 mm.

The advance per tooth corresponds to the distance the milling tool moves over the surface of the lens between cutting by two successive teeth of the tool.

As shown in FIGS. 1 and 2, step a) of the fabrication process is preferably divided into three substeps:

1) a blanking step having the following parameters:
    the pitch of the trajectory of the milling tool is in the order of 3 mm,
    the depth of pass of the milling tool is in the order of 4 mm,
    the advance per tooth of the milling tool is in the order of 0.05 mm, 2) a semifinishing step having the following parameters:
   the pitch of the trajectory of the milling tool is in the order of 2 mm,
   the depth of pass of the milling tool is in the order of 0.1 mm,
   the advance per tooth of the milling tool is in the order of 0.04 mm, and
3) a finishing step having the following parameters:
   the pitch of the trajectory of the milling tool is in the order of 1 mm,
   the depth of pass of the milling tool is in the order of 0.05 mm,
   the advance per tooth of the milling tool is in the order of 0.03 mm.

In the blanking, semifinishing step and finishing steps the trajectory of the milling tool remains a spiral and the rotation direction of the milling tool is the "pull" direction, as previously mentioned.

The quantity of material removed from the surface to be machined during the blanking step is fixed by the maximum capacity of the milling tool. If that capacity is less than the thickness of material to be removed, it is then necessary to consider the execution of multiple passes. The quantity of material removed from the surface of the lens to be machined during the semifinishing and finishing steps depends on the defects created on said surface by the milling tool during the preceding blanking step.

Figure 6:
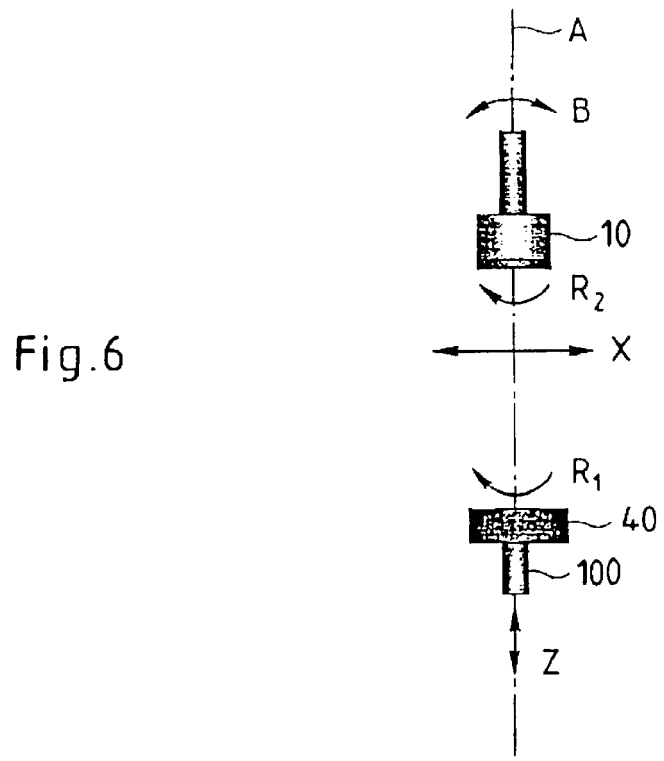
FIG. 6 is a partial diagrammatic representation of a machining machine tool of an installation in accordance with the invention.

The machining step a) is carried out using a machine tool shown diagrammatically in FIG. 6. The machine tool is part of an installation for implementing the process of the invention. It is a numerically controlled machine tool and includes a lens support 40 which can be moved in translation along a vertical axis A as shown by the arrows Z in FIG. 6. The support 40 can equally be driven in rotation (as shown by the arrow $R_1$) about the longitudinal axis of the shaft 100 carrying the support 40. Here, the longitudinal axis is a vertical axis. Moreover, the machine tool includes a milling tool 10 which can be moved in translation along a horizontal axis shown by the arrows X and inclined relative to a vertical axis, as shown in FIG. 6 by the arrows B. The milling tool 10 can be driven in rotation about the vertical axis A, as shown in FIG. 6 by the arrow $R_2$. The advance motions of the support 40 and the milling tool 10, namely the translation motion Z and rotation motion $R_1$ of the support 40 and the translation motion X and the inclination motion B of the milling tool are controlled simultaneously by said numerical control unit, the speed of the rotation $R_2$ of the milling tool 10 being controlled by the numerical control unit.

Figure 5:
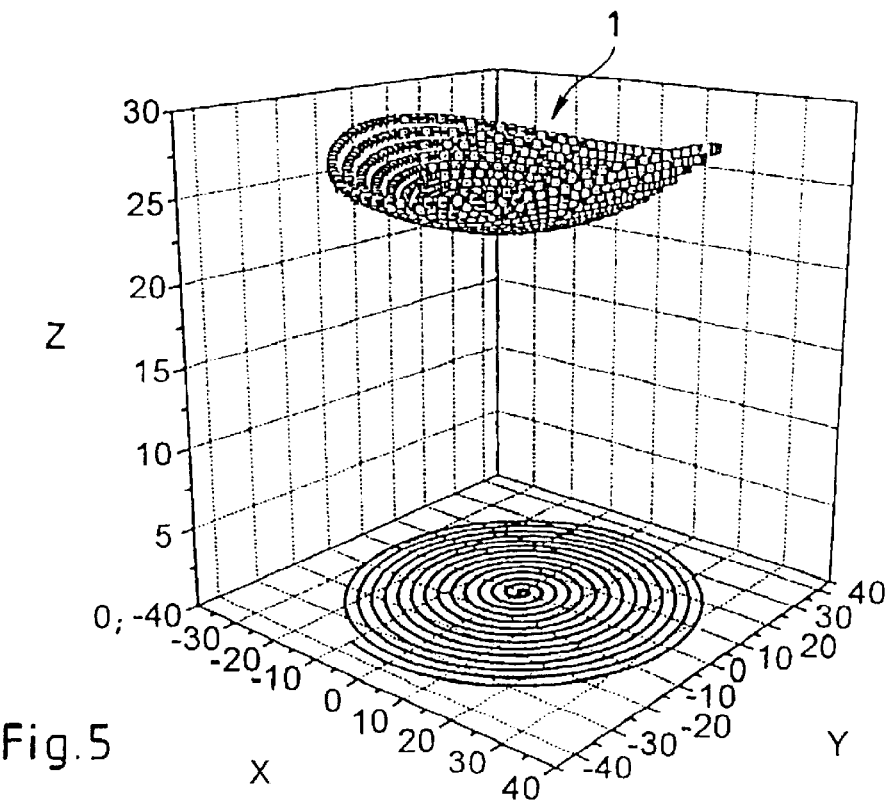
FIG. 5 is a diagrammatic perspective view projected into the X, Y plane of the trajectory of a milling tool during the first step of a process in accordance with the invention.

Because of the control function of the numerical controller of the machine tool, it is possible to trace along the axis Z shown in FIG. 5 the design of the surface to be machined on the ophthalmic lens (subject to an offset calculated according to the depth of each pass of the milling tool).

A numerically controlled machine tool of the above kind is described in European patent EP 0 685 298 in particular and the description of that patent may be referred to for more details of the construction of a machine of this kind.

The milling tool 10 of the machining machine tool used in step a) offers different geometries (spherical, toric, etc.) and is made of various materials, for example polycrystalline diamond or carbide.

To prevent problems of interference with said surface or depth of pass problems, the radius of the milling tool must be matched to the curvatures of the surface $S_1$ to be formed.

The milling tool is lubricated to prevent it overheating during the machining step a) divided into three substeps, preferably using an emulsion of oil in water (5% oil). The lubrication is advantageously directional and pressurized to carry away swarf formed by the machining operation and to clean the milling tool.

Figure 4A:
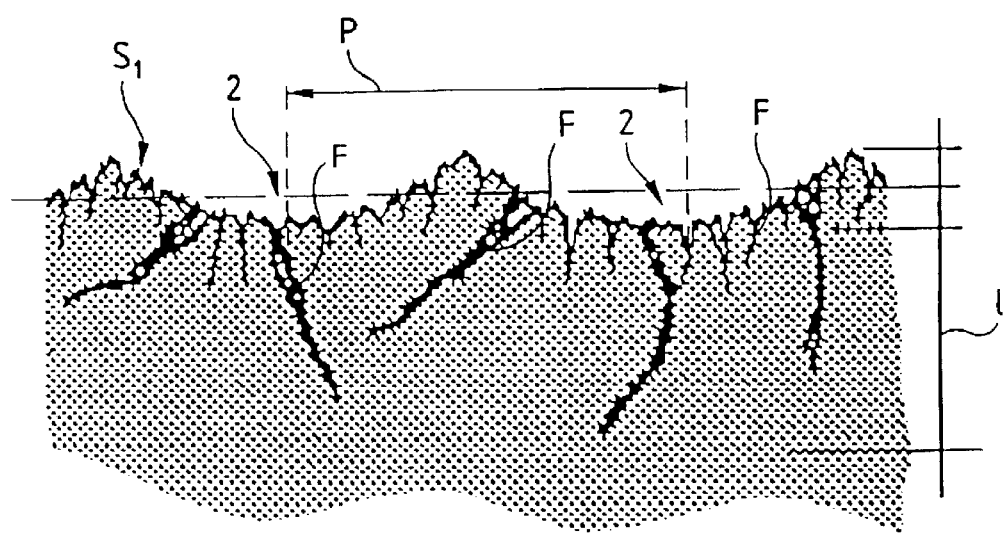
FIG. 4a is a detail view in section of part of the surface of an ophthalmic lens obtained after a first step of the process in accordance with the invention.

After machining step a), the machined surface $S_1$ shown in detail in FIG. 4a includes grooves 2 formed by the milling tool, two adjacent grooves 2 being spaced by a pitch P which is the pitch of the trajectory of the milling tool. The regularly spaced grooves 2 form undulations on the machined surface. The machined surface $S_1$ has a roughness (arithmetic mean roughness Ra) generated by the cutting tool which here is from approximately 0.1 $\mu$m to approximately 0.7 $\mu$m. What is more, the milling tool causes fractures and subsurface damage F with a maximum length 1 in the order of 5 $\mu$m.

In the process shown, the machining step a) is followed by a smoothing step b) to eliminate the undulations produced on the machined surface $S_1$, to reduce fractures and to modify the roughness of that surface to obtain a roughness less than 0.1 $\mu$m.

The smoothing step b) of the process of the invention consists in moving a smoothing tool along a continuous trajectory made up of passes in a surface envelope to be achieved, two adjacent passes being offset at a constant pitch from 0.2 mm to 3 mm to provide band-pass filtering of the undulations of that surface between a low frequency corresponding to said surface envelope and a high frequency corresponding to a background roughness.

The trajectory of the smoothing tool during smoothing step b) is a constant pitch spiral.

The pitch between two adjacent passes of the trajectory of the smoothing tool in step b) is advantageously from 0.40 mm to 1.25 mm and preferably equal to 0.625 mm.

Figure 4B:
FIG. 4b is a detail view in section of part of the surface of an ophthalmic lens obtained after a second step of the process in accordance with the invention.

The smoothed surface $S_1$ obtained in step b) is shown in FIG. 4b and preferably has a roughness from 0.05 $\mu$m to 0.07 $\mu$m.

Figure 7:
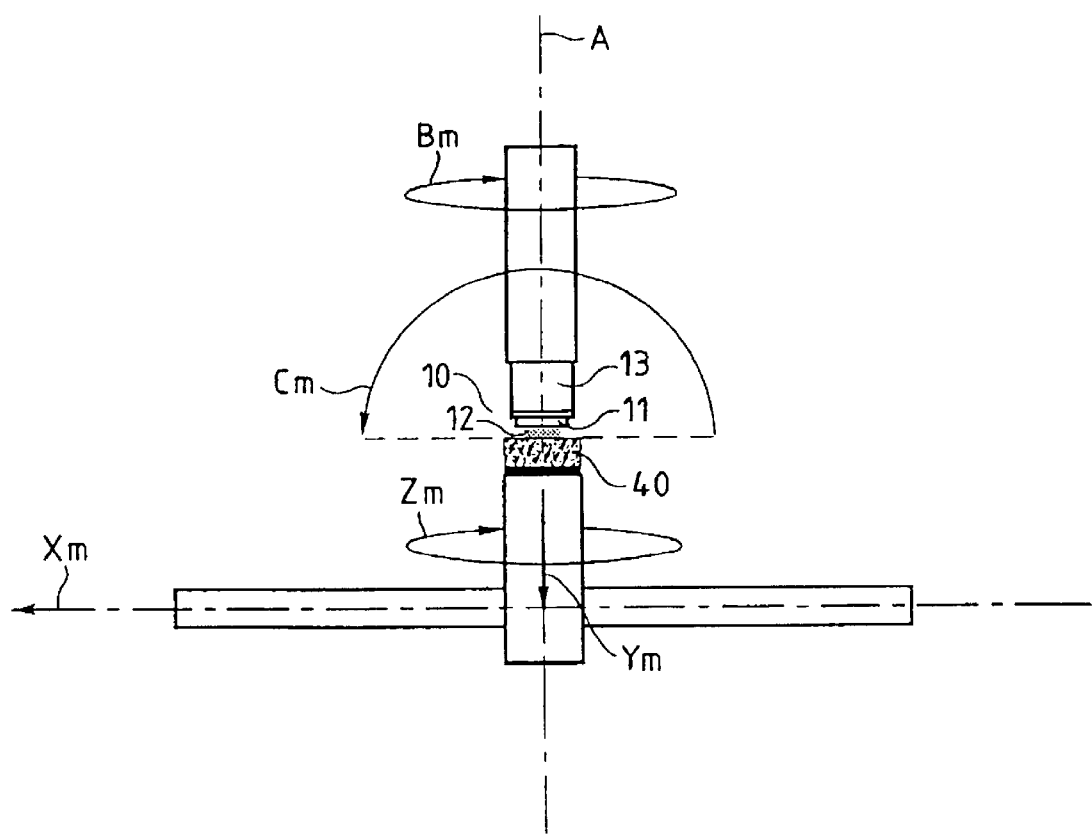
FIG. 7 is a partial diagrammatic representation of a smoothing machine tool of an installation in accordance with the invention.

The smoothing step b) is carried out on a smoothing machine shown diagrammatically in FIG. 7.

The smoothing machine is a numerically controlled machine tool including a lens support 40 which can be moved in translation along a vertical axis Ym and driven in rotation about a parallel vertical axis A, as shown by the reference Zm in FIG. 7. The smoothing machine also includes a smoothing tool 10 carried by a shaft 13 enabling the tool to be driven in rotation. The tool 10 rotates about the vertical rotational drive axis A of the support and this rotation is shown by the reference Bm in FIG. 7. The smoothing tool 10 can also be moved in translation along the horizontal axis Xm and inclined relative to the vertical axis about which it is driven in rotation, the inclination being shown in FIG. 7 by the reference Cm.

As in the machining machine tool, the advance motions of the support and the tool, namely the translation and rotation motions of the support 40 and the translation and inclination motions of the smoothing tool 10, are simultaneously controlled by the numerical control unit of the smoothing machine, the speed of rotation of the smoothing tool 10 being controlled by the numerical control unit.

Here the smoothing machine tool is also of the type described in European patent EP 0 685 298.

The speed of movement along the axes is determined to obtain a quasiconstant rate of advance of the smoothing tool 10 over the surface to be machined.

Figure 8:
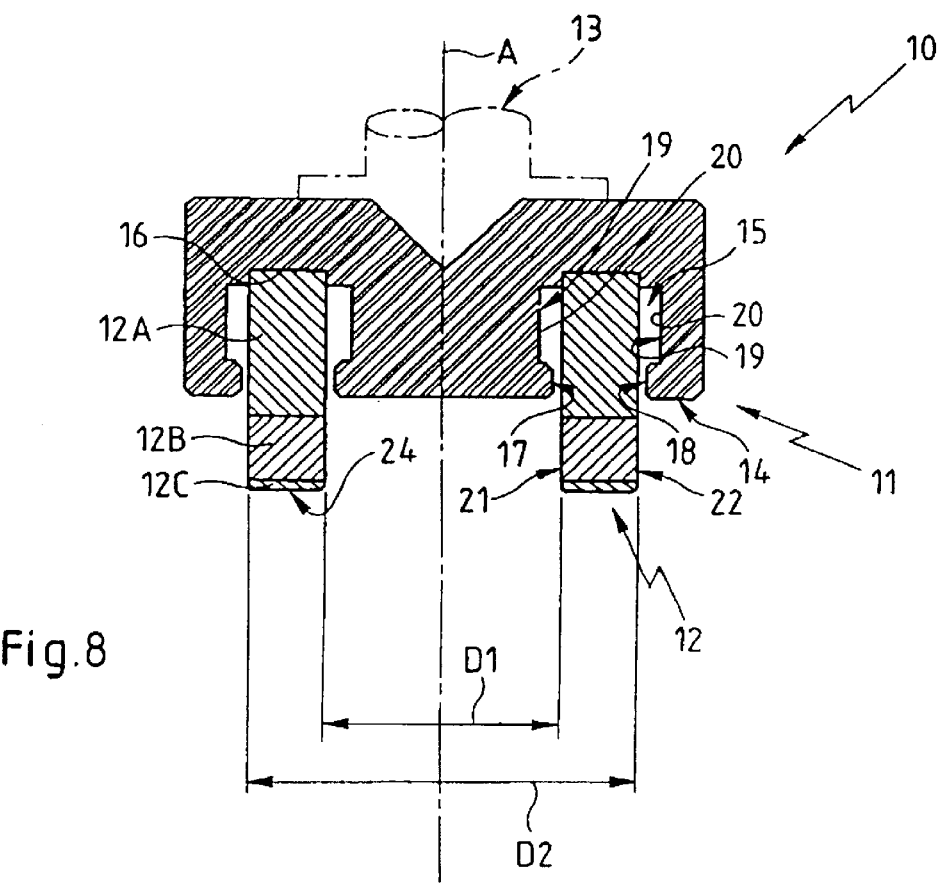
FIG. 8 is a view in axial section of the smoothing tool of the machine tool shown in FIG. 7.

The smoothing tool 10 of the smoothing machine is shown in FIG. 8.

The smoothing tool 10 includes an annular rigid support 11 and a tool 12 fastened to the support 11, which has dimensions which are small compared to those of the surface to be smoothed but relatively large compared to the defects to be eliminated.

In one embodiment of the invention, the tool 12 has an inside diameter D1 from 6 mm to 10 mm and an outside diameter D2 from 10 mm to 15 mm. The inside diameter D1 is preferably in the order of 6 mm and the outside diameter D2 is preferably in the order of 10 mm.

The rigid support 11 is carried by the shaft 13. It has an annular housing 15 recessed into its transverse surface 14 opposite the shaft 13, i.e. its free surface, and the tool 12 is attached to the bottom of this housing. The tool 12 is attached to the bottom 16 of the annular housing 15 of the support 11. The tool 12 projects beyond the support 11, i.e. beyond its free surface 14.

Apart from the bottom 16, the annular housing 15 of the rigid support 11 is defined by two coaxial lateral surfaces 17, 18 concentric with the rotation axis A of the tool and substantially perpendicular to the bottom 16.

In the embodiment shown in FIG. 8 the lateral surfaces 17, 18 of the annular housing 15 have a groove 19 recessed into them.

The groove 19 is in the middle area of the lateral surfaces 17, 18, extending approximately half their height, and in the embodiment shown its bottom 20 is cylindrical and concentric with the rotation axis A of the smoothing tool.

In the embodiment shown in FIG. 8, the tool 12 is itself delimited by cylindrical lateral surfaces 21, 22 and covers the whole of the bottom 16 of the annular housing 15 in the support 11.

The annular section of the tool is concentric with the rotation drive axis A of the shaft 13 of the smoothing tool.

In the embodiment shown in FIG. 8 the smoothing tool includes three superposed parts 12A, 12B, 12C.

The first part of the tool 12 of the smoothing tool is an elastically deformable core 12A.

The elastically deformable core 12A is made of an elastomer, for example, and its elasticity is chosen according to the required deformation capacity and the bearing force to be withstood in use.

The Shore A hardness of the elastically deformable core 12A is from 30° to 80°, for example, and preferably from 40° to 70°, for example equal to 40°.

As shown in FIG. 8, the elastically deformable core 12A extends beyond the support 11 and therefore projects from the free surface 14 thereof.

The tool 12 next includes an elastically deformable layer 12B whose elasticity is less than that of the core 12A.

Whereas the function of the elastically deformable core 12A is to accommodate deformations of the worked optical surface, enabling the system to adapt to that optical surface, the function of the surface layer 12B is to impart all the rigidity required of the system to obtain the required smoothing.

The surface layer 12B is made of polyurethane, for example.

The tool next includes an abrasive film 12C or a support driving an abrasive which forms the working surface 24 of said tool.

The abrasive film 12C is a diamond surface, for example, having a particle size range from 1 $\mu$m to 45 $\mu$m and preferably from 1 $\mu$m to 15 $\mu$m, for example equal to 6 $\mu$m.

For example, the three component parts of the tool 12, i.e. the elastically deformable core 12A, the surface layer 12B and the abrasive film 12C, are glued together and the tool 12 is glued to the support 11.

The fabrication process shown in FIGS. 1 and 2 advantageously includes, after the smoothing step b), a step c) of applying a layer of varnish V to said smoothed surface to confer a polished surface state on the surface $S_1$.

A varnish layer from 500 Ra to 800 Ra thick is deposited on said smoothed surface during this step, where Ra is the roughness of the surface obtained in smoothing step b).

The minimum thickness of the layer of varnish deposited on the surface in step c) is from 30 Ra to 200 Ra, where Ra corresponds to the roughness of the surface obtained in step b) of the process.

The varnish deposited in the liquid state on the smoothed surface $S_1$ has a viscosity at 25° C. from 1000 mPas to 3000 mPas.

It also has a refractive index equal to the refractive index of the substrate, i.e. the ophthalmic lens, to within a tolerance of ±0.01.

The varnish and the lens therefore constitute a single diopter.

An acrylic or epoxy material can be used as the varnish.

For example, the liquid varnish composition used includes:

- a polyacrylate or poly(meth)acrylate monomer, and possibly a (meth)acryloxysilane, or
- a monomer with epoxy function(s), or mixtures thereof.

This composition includes at least one polyacrylate monomer or at least one monomer with epoxy function(s). It can include a mixture of diacrylate and triacrylate monomers. The diacrylate monomer then preferably includes an aliphatic diacrylate urethane polyester and is chosen from trimethylolpropane ethoxyletriacrylate and pentaerythritol triacrylate. The diacrylate/triacrylate weight ratio advantageously varies from 50/50 to 40/60. The liquid varnish composition used in step c) can also include a mixture of a monoacryloxisilane and a polyacrylate. The polyacrylate then includes dipentaerythritol pentaacrylate. The liquid varnish composition further includes colloidal silica or a halogenated and preferably bromine-containing epoxy acrylate oligomer and possibly an acrylate monomer having an index at least 0.1 lower than that of the halogenated epoxyacrylate.

Figure 9:
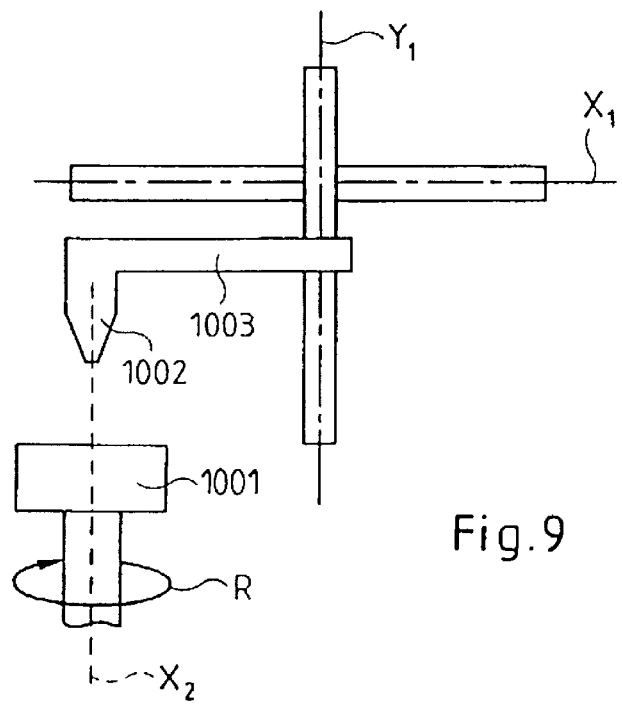
FIG. 9 is a diagram showing part of a varnish depositing machine of an installation in accordance with the invention.

FIG. 9 shows that the machine for applying the layer of varnish to the smoothed surface of the lens advantageously includes a lens support 1001 which can be driven in rotation R about a vertical axis $X_2$ and an arm 1003 carrying a nozzle 1002 for distributing the liquid varnish at low pressure, movable in translation along the axes $X_1$ (horizontal) and $Y_1$ (vertical) relative to the support 1001.

The varnish can be deposited on the surface by this machine in three different ways.

The total quantity of varnish can be deposited at the center of the surface $S_1$ with the lens stopped. The nozzle 1002 is then concentric with the rotation axis $X_2$ of the support 1001.

The varnish is then spread centrifugally, by driving the lens in rotation about the axis $X_2$.

This corresponds to the process shown in FIG. 1.

The varnish is spread by slow centrifuging, the acceleration, speed and duration of the rotation of the lens being controlled to conserve a maximum of varnish.

For example, the spreading can be performed by driving the lens in rotation at 500 rpm for 10 seconds.

In a second, semidynamic embodiment the nozzle is held at a fixed position, concentric with the axis $X_2$ of the support 1001, and the deposition is performed while the lens is driven in rotation.

In a third embodiment shown in FIG. 2, the layer of varnish can be deposited by combining rotation of the lens about the axis $X_2$ and movement of the arm 1003 from the center toward the edge of the lens or from the edge toward the center of the lens by movement of said arm 1003 in translation along the axis $X_1$.

This corresponds to dynamic deposition of the varnish on the lens, which can be advantageous for covering surfaces with high toric components.

The varnish is then tensioned on said surface by driving the lens in rotation at a speed equal to approximately 1000 rpm. The duration of the varnish tensioning step is in the order of 50 seconds.

The pressure of the varnish distribution nozzle is low, in the order of $0.7 \times 10^5$ Pa, to obtain a deposit of varnish free of bubbles.

The height the varnish falls is a parameter which can be set by moving the arm 1003 along the axis $Y_1$ but remains fixed during the deposition of the varnish on the lens.

When the layer of varnish has been deposited on the lens using the process shown in FIGS. 1 and 2, whether that is a static, semidynamic or dynamic deposition process, the varnish is left to stand for a period from 2 minutes to 3 minutes at room temperature (from 25° C. to 30° C.). The time for which the varnish is left to stand at room temperature improves the quality of the polishing.

Next comes the final step of polymerizing the varnish, which here is advantageously achieved by photopolymerizing the layer of varnish, preferably using ultraviolet radiation. This mode of polymerization is faster than the thermal mode and can be carried out at room temperature. It requires the varnish to be photopolymerizable.

The process as described was used to produce a lens L as shown in FIG. 3 which had a smoothed concave surface $S_1$ covered with a layer of varnish V conferring a polished surface state on it. The thickness of the varnish was approximately 40 μm, for example. After step a), the surface of the lens had a roughness Ra in the order of 0.18 μm.

After step b), the surface had a roughness Ra in the order of 0.06 μm.

The thickness of varnish deposited was therefore approximately 670 Ra in this example.

In this example, the lens was made of a thermosetting material, to be more precise allyldiethylene glycol polycarbonate, having an index in the order of 1.50 and preferably equal to 1.502.

Here the refractive index of the layer of varnish was equal to 1.50 and preferably equal to 1.502. The convex surface $S_2$ of the lens shown in FIG. 3 was formed directly by molding.

More generally, the lens can have a refractive index not greater than 1.55 and can be obtained by polymerizing a composition based on diethylene glycol bis[allylcarbonate].

It can equally have a refractive index greater than 1.55 and a refractive index in the order of 1.590 and then consists of a polymer based on bisphenol A polycarbonate.

The present invention is in no way limited to the embodiment described and shown, and the skilled person will know how to derive any variant thereof within the scope of the invention.

There is claimed:

1. A process of fabricating a surface of an ophthalmic lens in accordance with a given prescription, including the following steps:
    a) machining said surface by removing material by moving a cutting tool along a continuous trajectory in a surface envelope to be achieved to form grooves, two adjacent grooves being spaced by a constant pitch from 0.01 mm to 3 mm, to obtain a surface having an arithmetic mean roughness Ra from approximately 0.1 μm to approximately 0.7 μm, and
    b) smoothing the machined surface by moving a smoothing tool along a continuous trajectory formed of passes within the surface envelope to be achieved, two adjacent passes being spaced by a constant pitch from 0.2 mm to 3 mm, to eliminate the undulations of the machined surface, formed by said grooves, to reduce fractures and to modify the roughness of that machined surface to obtain a smoothed surface having an arithmetic mean roughness Ra less than 0.1 μm.

2. The process claimed in claim 1 wherein a smoothed surface having a roughness Ra from 0.05 μm to 0.07 μm is obtained in step b).

3. The process claimed in claim 1 wherein the pitch between two adjacent passes of the trajectory of the smoothing tool in step b) is from 0.40 mm to 1.25 mm.

4. The process claimed in claim 1 wherein the pitch between two adjacent passes of the trajectory of the smoothing tool in step b) is equal to 0.625 mm.

5. The process claimed in claim 1 wherein the trajectory of the smoothing tool in step b) is a spiral.

6. The process claimed in claim 1 wherein the trajectory of the cutting tool in step a) is a spiral.

7. The process claimed in claim 1 wherein the cutting tool used in step a) is a milling tool.

8. The process claimed in claim 7 wherein the milling tool in step a) has a "pull" rotation direction.

9. The process claimed in claim 7 wherein the depth of a pass of said milling tool in step a) is from approximately 4 mm to approximately 0.05 mm.

10. The process claimed in claim 7 wherein the advance per tooth of said milling tool is from 0.05 mm to 0.03 mm.

11. The process claimed in claim 7 wherein step a) is divided into three substeps:
    1) a blanking step having the following parameters:
        the pitch of the trajectory of the milling tool is in the order of 3 mm,
        the depth of pass of the milling tool is in the order of 4 mm,
        the advance per tooth of the milling tool is in the order of 0.05 mm,
    2) a semifinishing step having the following parameters:
        the pitch of the trajectory of the milling tool is in the order of 2 mm,
        the depth of pass of the milling tool is in the order of 0.1 mm,
        the advance per tooth of the milling tool is in the order of 0.04 mm, and
    3) a finishing step having the following parameters:
        the pitch of the trajectory of the milling tool is in the order of 1 mm,
        the depth of pass of the milling tool is in the order of 0.05 mm,
        the advance per tooth of the milling tool is in the order of 0.03 mm.

12. A process as claimed in claim 1 including after step b) a step c) of applying to said smoothed surface a layer of varnish to confer a polished surface state on said surface.

13. The process claimed in claim 12 wherein the minimum thickness of said layer of varnish deposited on said surface in step c) is from approximately (30) (Ra) to approximately (200) (Ra), where Ra corresponds to the surface roughness obtained in step b).

14. The process claimed in claim 12 wherein the thickness of said layer of varnish deposited on said surface in step c) is from approximately (500) (Ra) to approximately (800) (Ra), where Ra corresponds to the surface roughness obtained in step b).

15. The process claimed in claim 12 wherein said varnish is deposited in the liquid state on said surface and has a viscosity at 25° C. from 1000 mPas to 3000 mPas.

16. The process claimed in claim 12 wherein said varnish deposited on said smoothed surface in step c) has a refractive index equal to the refractive index of said ophthalmic lens to within a tolerance of ±0.01.

17. The process claimed in claim 14 wherein the varnish used in step c) is a liquid varnish composition and contains:

a polyacrylate or poly(meth)acrylate monomer, and possibly a (meth)acryloxysilane, or a monomer with epoxy function(s), or mixtures thereof.

18. The process claimed in claim 14 wherein said liquid varnish composition used in step c) includes at least one polyacrylate monomer or at least one monomer with epoxy function(s).

19. The process claimed in claim 18 wherein said liquid varnish composition includes a mixture of diacrylate and triacrylate monomers.

20. The process claimed in claim 19 wherein said diacrylate monomer includes an aliphatic diacrylate urethane polyester.

21. The process claimed in claim 19 wherein said triacrylate monomer is chosen from trimethylolpropane ethoxyletriacrylate and pentaerythritol triacrylate.

22. The process claimed in claim 19 wherein the ratio of diacrylate to triacrylate by weight varies from 50/50 to 40/60.

23. The process claimed in claim 14 wherein said varnish used in step c) is a liquid varnish composition and includes a mixture of a moncocryloxysilane and a polyacrylate.

24. The process claimed in claim 23 wherein said polyacrylate includes dipentaerythritol pentaacrylate.

25. The process claimed in claim 23 wherein said liquid varnish composition further includes colloidal silica.

26. The process claimed in claim 14 wherein said varnish is a liquid varnish composition and includes a halogenated and preferably bromine-containing epoxyacrylate oligomer.

27. The process claimed in claim 26 wherein said liquid varnish composition further includes an acrylate monomer having an index at least 0.1 less than that of the halogenated epoxy acrylate.

* * * * *